(12) United States Patent
Pei et al.

(10) Patent No.: US 8,584,224 B1
(45) Date of Patent: Nov. 12, 2013

(54) TICKET BASED STRONG AUTHENTICATION WITH WEB SERVICE

(75) Inventors: Mingliang Pei, Palo Alto, CA (US); Jeff Burstein, San Jose, CA (US); Liyu Yi, Fremont, CA (US); Rosarin Jolly Antonyraj, Sunnyvale, CA (US); Rong Cao, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 175 days.

(21) Appl. No.: 13/085,786

(22) Filed: Apr. 13, 2011

(51) Int. Cl.
  *G06F 7/04* (2006.01)
  *H04L 9/32* (2006.01)
(52) U.S. Cl.
  USPC .................. 726/10; 726/4; 726/26; 713/168; 713/170; 713/171; 713/176
(58) Field of Classification Search
  USPC ........... 726/10, 4, 26; 713/168, 170, 171, 176
  See application file for complete search history.

(56) References Cited

U.S. PATENT DOCUMENTS

| 2003/0233551 | A1* | 12/2003 | Kouznetsov et al. | 713/175 |
| 2005/0005114 | A1* | 1/2005 | Medvinsky | 713/168 |
| 2005/0015594 | A1* | 1/2005 | Ashley et al. | 713/168 |
| 2007/0186106 | A1* | 8/2007 | Ting et al. | 713/168 |

* cited by examiner

*Primary Examiner* — Aravind Moorthy
(74) *Attorney, Agent, or Firm* — Lowenstein Sandler LLP

(57) ABSTRACT

A system for authenticating a user to a relying party. A user sends an access request to a relying party web application. In response, the application sends a page with JavaScript that detects a plug-in at the user and detects the relying party domain. The plug-in uses its device certificate or other pre-established credentials to sign a challenge along with other site and user information including the site domain, the authentication service URL and user identifier, and send it, along with the data including the domain and the user identifier, to an authentication service. The service authenticates the information and sends back to the plug-in a short ticket that can be passed on to the relying party, which can validate it using the Radius protocol and an authentication service call, thereby authenticating the user.

19 Claims, 3 Drawing Sheets

TICKET BASED STRONG AUTHENTICATION WITH WEB SERVICE

BACKGROUND OF THE INVENTION

A user can be authenticated from computer desktop or mobile device by utilizing a user or device credential. In a federated authentication system, the user can be redirected to the third party authentication service, which can use Security Assertion Markup Language (SAML) to communicate user authentication result with the customer system. New credential types can easily be added for enterprises where the authentication service handles all of the credential lifecycle management interfaces. However, this doesn't accommodate customers who want to have full control over user workflow. Also, the service model requires a customer system to handle SAML request signing and verification, which may not always be the case. For example, the Radius protocol is more widely used by enterprise VPN servers.

What is needed is a service model that needs little integration by enterprise servers and that provides the users with the superior experience and security while permitting the customer to retain full control over user authentication workflow. When the requirement of enterprise system SAML integration is eliminated, the user authentication credential communication and authentication ticket should ensure end-to-end security across the systems.

SUMMARY OF THE INVENTION

A system for authenticating a user to a relying party, such as a SSL VPN application. A user can send an access request to a relying party web application. In response, the application can sends a page with JavaScript that detects a service-provided browser plug-in at the user. The plug-in can use its device certificate to sign a challenge along with other site and user information including the authentication service URL, the relying party domain and the user identifier and send it along with the data to be signed, to an authentication service. The service authenticates the signature using the device key, and validates that the authentication service URL is correct, and that the site domain is from its customers or trusted sites. It generates a short ticket, which can be bound to the domain, the device, and the optional user identifier, and sends it back to the plug-in. The ticket can be passed to the relying party as if it is a user password, which can use existing authentication workflow such as the Radius protocol. For example, the ticket can be passed from the relying party application to an authentication service enterprise gateway using the standard Radius protocol, which can validate the ticket using the authentication service. The relying party domain can also be verified via the ticket and domain binding in the service and the authentication service URL can be verified, thereby mitigating the possibility of man-in-the-middle attacks between the user and the relying party. The user can be authenticated via the user and ticket binding that ensures that only the user who activates the device to its account is authenticated.

DETAILED DESCRIPTION

A superior user experience can be provided while permitting the customer to retain control over authentication workflow by providing a web service API rather than redirecting users to a third party authentication service. This can be implemented for a SSL VPN gateway (and similar applications) and for web applications.

The legacy Radius channel used by SSL VPN has a message size limit that cannot directly pass large SAML message and other data that are produced by standard, third party authentication SAML-based services. For example, a Radius password field allows for no more than 128 bytes, while a 2048-bit key-generated signature is 256 bytes and the size of a typical SAML authentication assertion is larger than 128 bytes. This limitation can be overcome by using out-of-band communications and a ticket model that enables seamless strong authentication to legacy, Radius-based applications while using SaaS-based web services.

Rather than passing the signature itself in the Radius protocol, a short ticket can be obtained by a browser plug-in from a third party authentication service. The authentication service can also verify the domain name of the requesting site to ensure trusted use of the ticket.

Figure 1:
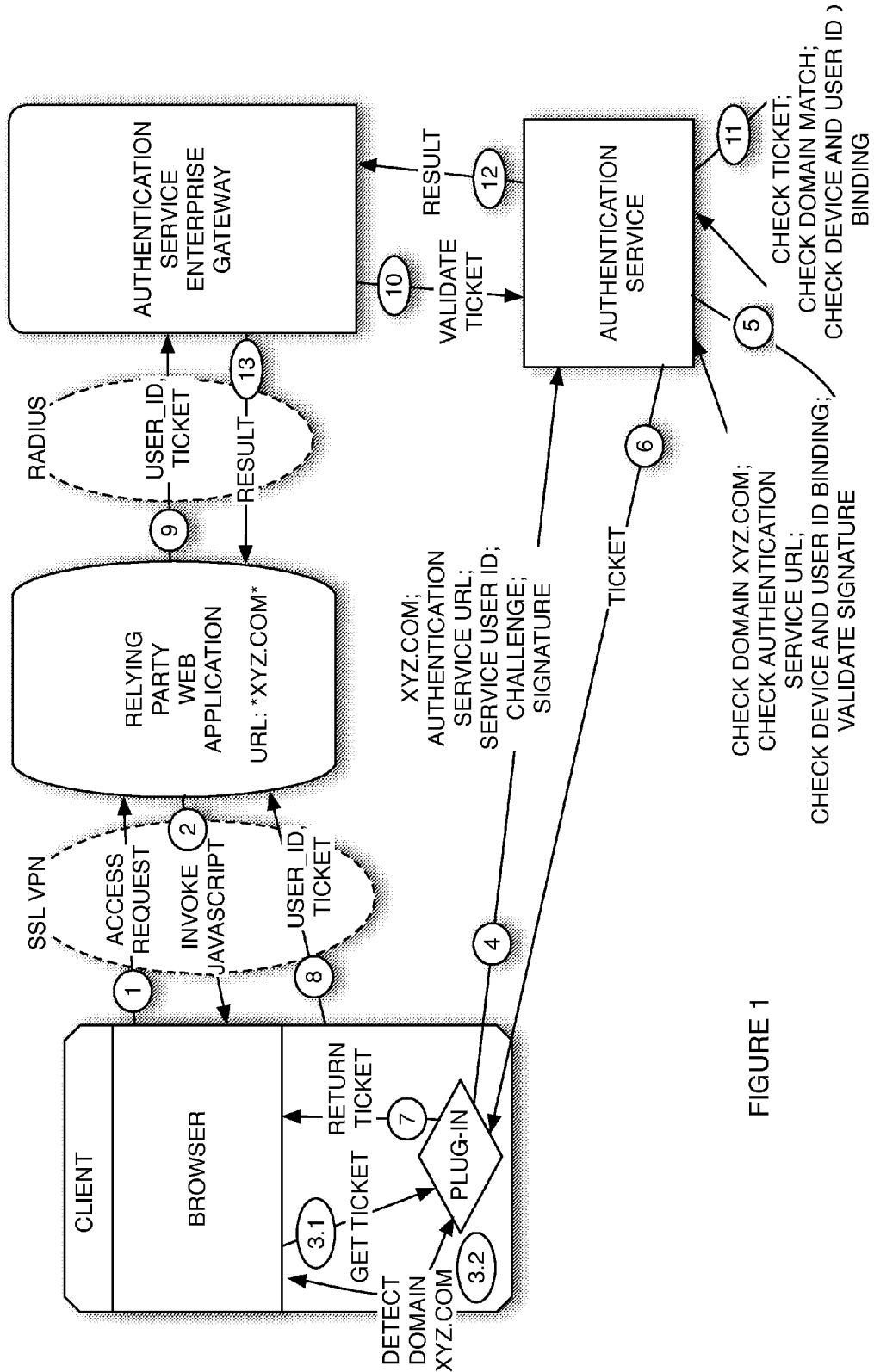
FIG. 1 shows a system for authenticating a user to a relying party partly using the Radius protocol.

An example of an authentication system is shown in FIG. 1. In step 1, a user accesses a Relying Party Web Application (1). A Web Application can be a website, a SaaS site, a SSL VPN gateway or any network-based, software-based service. The Web Application can be configured to invoke JavaScript that can detect the browser plug-in (2). The user identifier can be collected by the web application before or after the plug-in call to get the ticket (2). This user identifier in the request to the service can be the same login user identifier to the relying party or an alias of the login identifier that a user registers at the service when the device credential is activated. The browser plug-in receives a request from the browser for a ticket (3.1) and detects the customer's domain name xyz.com (3.2). The browser plug-in can make a service call to an authentication service (4). The service call can include inputs such as the customer's domain name (xyz.com in FIG. 1); a random or pseudo-random challenge value; the user identifier provided by the user; and a signature generated by the plug-in. The random challenge can be a nonce to prevent replay attacks. The service can also include other inputs, such as a public key certificate identifier. The authentication service can validate the inputs by checking to ensure that the submitted domain name is registered as one of the Relying Party domain names (5). For example, the service can determine if the input domain name is on a list of registered domain names stored at the authentication service. The service also verifies the signature (5). The service can also verify that the user has registered the device for its account (5) if a user identifier is supplied in the request. The service can also verify that the authentication service URL in the signed request is its service URL, mitigating man-in-the-middle attack where a hacker application directs the plug-in to connect to itself and steal the ticket (5). If the domain name is registered, the service URL matches, and the signature is valid, the service can generate and return a ticket that can be shorter than the signature and can fit into Radius user-password attribute (6). For example, the service can return a 16-byte assertion identifier as the ticket, a simple 6 digit string that looks like a typical One-Time-Password or any other suitable piece of data for authenticating the user.

Upon receiving the ticket from the authentication service, the plug-in can pass the ticket to the browser (7). The browser can treat the ticket as a password and pass it along to the Relying Party Web Application along with a user identifier (8). The Relying Party then can pass the user identifier and the ticket to the authentication service enterprise gateway using the Radius protocol (9). Although an authentication service enterprise gateway is show in FIG. 1, any suitable server or gateway can be used. For example, the gateway can be an existing customer authentication server, which can allow a server extension plug-in to communicate with an authentication service. This is possible because the size of the ticket is sufficiently small to be handled by Radius. The authentication service enterprise gateway makes an authentication service call to validate the ticket (10). The authentication service can be a service available on the web that can be accessed using the HTTP protocol, or any network-available service that uses any other suitable protocol. The call can include inputs such as the ticket, the user identifier, the domain name associated with the ticket, etc. The authentication service validates the ticket and checks to ensure that the associated domain name belongs to the customer and the user has been associated with the device (11). The service can send the result to the enterprise gateway (12), which can return the result to the Relying Party (13). The system shown in FIG. 1 permits a customer to control how and when it interacts with a user to collect credentials.

The foregoing example is not meant to be limited to digital certificates. It can be used to authenticate virtually any credential, including an OTP token, a biometric device, etc. For example, for an OTP token, a One Time Password is sent from the plug-in to the authentication service for verification. The plug-in can include a software token that generates OTPs, or can collect an OTP generated by a hardware token connected to the client, e.g., via a USB port, or entered manually by a user. Likewise, a biometric sample or data based upon a biometric sample can be sent instead of a signature to the authentication service for validation. As another example, digitally signed biometric data may be sent to the authentication service for validation of both the data and the signature. The system thus can provide authentication based upon one or more credentials. In some situations, the credentials can be combined.

Verifying the customer (relying party) site domain can help to mitigate a hacker web site that redirects a user to its site for authentication, which can cause misuse of the ticket and unnecessary traffic. The plug-in can detect and send the hacker's domain to the authentication service. The authentication service then won't issue a ticket back for the request upon the domain trust check, e.g., comparing the purported relying party domain to a list of known hacker domains, comparing the purported relying party domain with a whitelist of approved relying party domains, etc. With the domain check in the authentication service, a legitimate relying party B isn't able to get a ticket that can be used for a different relying party A. The authentication service will issue a ticket that is bound to only the customer's own domain.

The browser plug-in can be trusted by provisioning an underlying device certificate to the plug-in. During a bootstrapping step when a user downloads the browser plug-in, the plug-in can acquire a non-exportable certificate from the authentication service and store it in its own secure storage area without necessarily using browser's key store. The device certificate itself can be used for actual strong user authentication without using other credentials such as an OTP or biometric data. However, such other credentials can be added and used in combination with each other to ensure trust and a correct authentication result.

Figure 2:
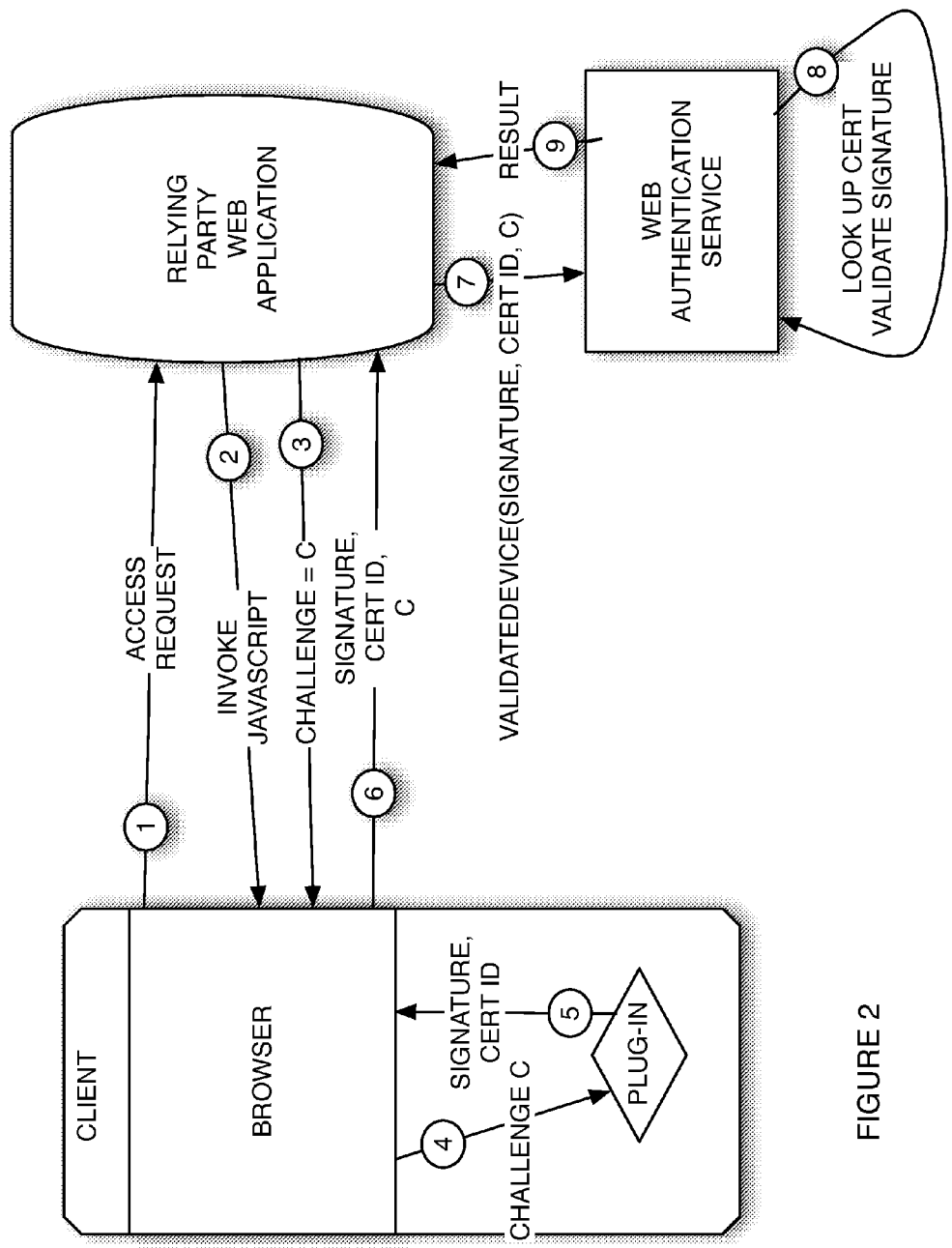
FIG. 2 shows another system for authenticating a user to a relying party.

FIG. 2 shows a system where a customer web application can make direct authentication service, which can provide a signature validation API such as the following:
ValidateDevice:
  Input:
    Signature. A signature generated by a device certificate over a Challenge and site domain as well as other user identifier information.
    Challenge. A random value that can be signed.
    Certificate ID. The device certificate's identifier.
    Authentication Service Customer Certificate. The authentication service certificate that identifies the customer.
  Output:
    True/False. The result of the validation.

As shown in FIG. 2, a user visits the customer (Relying Party) web application (1). The web application page contains JavaScript that detects that the user has a service provided plug-in and a device certificate (2). The web application sends a random challenge C (such as a nonce) to the plug-in (3) and (4). The plug-in uses the device certificate to sign the challenge C and site domain that it detects and returns it along with the certificate identifier to the browser (5). The browser sends the signature, challenge and certificate identifier to the customer application (6). The customer application calls the authentication service, which has access to a copy of the device certificate (7). In so doing, the customer can call ValidateDevice and send to the authentication service the signature, certificate identifier and challenge. The authentication service can look up the signing certificate based upon the received certificate identifier, generate a signature of challenge C and compare it to the received signature (8). If they correspond, then the signature is validated and the authentication service can return a positive result to the Relying Party Web Application (9). If not, the result can be returned to indicate a failed authentication attempt.

Figure 3:
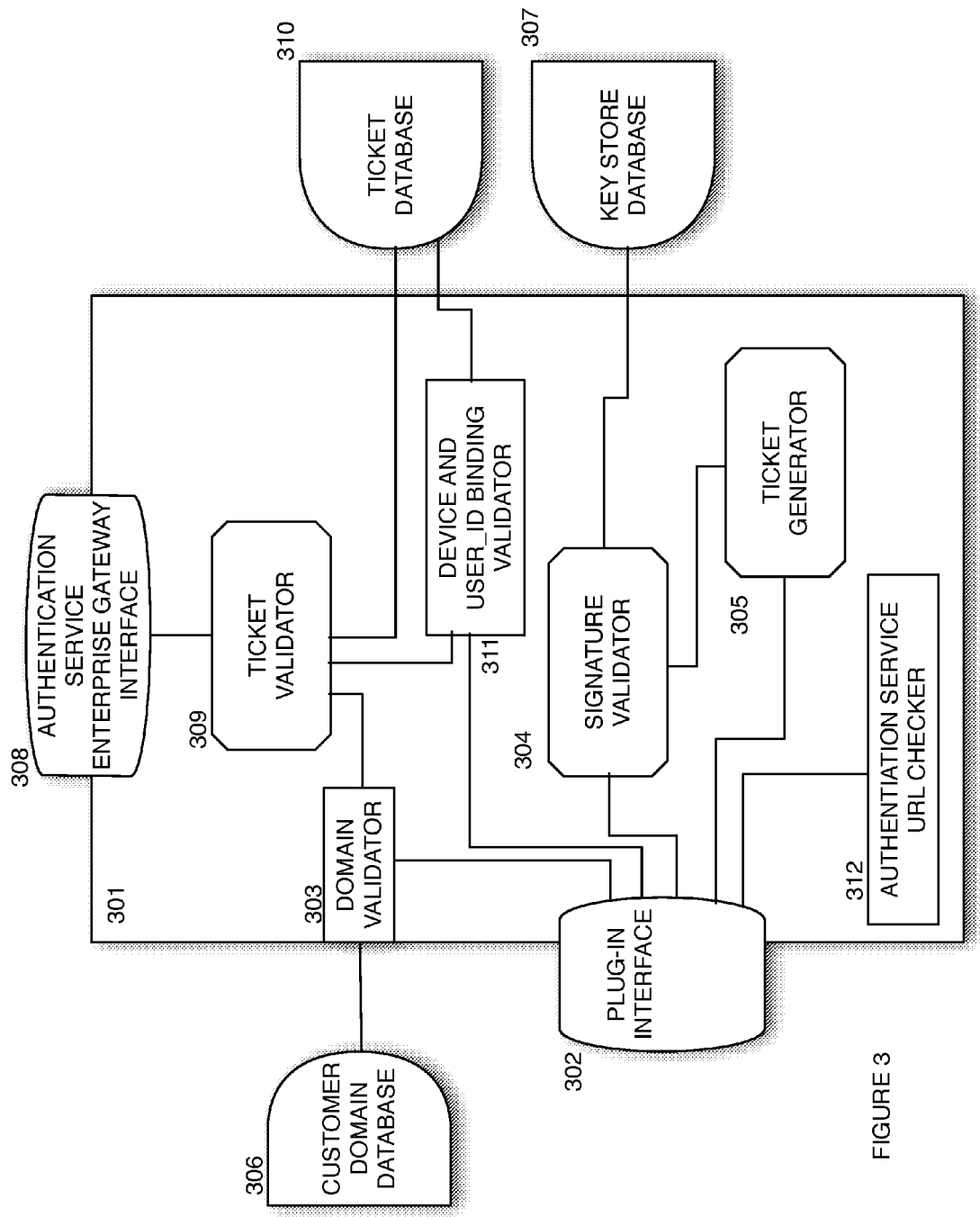
FIG. 3 shows an apparatus for authenticating a user to a relying party.

An authentication apparatus is shown in FIG. 3. An authentication service 301 includes a plug-in interface 302 in communication with domain validator 303, signature validator 304, device and user identifier binding validator 311, authentication service URL checker 312 and ticket generator 305. Plug-in interface 302 is in communication with a plug-in (not shown), from which it receives a domain, a user identifier, the authentication service URL known to the plug-in, a challenge and a signature that can be performed over all or part of this information. Plug-in interface 302 sends the authentication service URL to the authentication service URL checker 312, which checks that the service URL to which the plug-in initially sends a request is the correct URL for the authentication service. Plug-in interface 302 sends the domain to domain validator 303, which is in communication with customer domain database 306, which stores records listing registered customer domains. Domain validator 303 checks the domain received from the plug-in interface 302 against the records stored in customer domain database 306 and returns a positive or negative result to plug-in interface 302. Plug-in interface 302 sends the signature and the data that is signed and received from the plug-in to signature validator 304, which calculates its own signature of the data including the challenge, the service URL, the domain and user identifier, based upon the plug-in device key. The device key may be derived from the request if it is a public key or be retrieved from key store database 307. This calculated signature is called a "local signature". If the local (calculated) signature corresponds to the signature received from the plug-in interface 302, then the signature validator 304 returns a positive result to plug-in interface 302. Otherwise, it returns a negative result. The device and user identifier validator 312 can check that the device belongs to the user where the binding relationship is stored in the ticket database (or any other suitable database (not shown)) when a user activates the device certificate during provisioning. This serves to provide an early error report to the user but may occur at any time, such as when the enterprise gateway requests the ticket validation. If the plug-in interface 302 receives positive results from both the domain validator 303 and signature validator 304, then it sends a message to the ticket generator 305 to generate a ticket. Upon receiving the ticket from the ticket generator 305, it sends the ticket to the plug-in.

Authentication service 301 also includes an authentication service enterprise gateway interface 308, which receives a ticket and a user identifier and customer (relying party) domain from an authentication service enterprise gateway. Interface 308 authenticates the customer call to identify who the customer is and to determine that the customer is entitled to access the validation interface. It then sends the received ticket to ticket validator 309, which is in communication with ticket database 310. Ticket database 310 stores records corresponding to valid tickets and the domain and device information associated with the ticket. Ticket validator 309 queries the database 310 to determine if valid ticket data stored in the ticket database 310 corresponds to the ticket received from interface 308. The ticket validator 309 can also check whether the user identifier received from the interface 308 matches the ticket that is associated with the ticket binding information in the ticket database 310. Likewise, ticket validator 309 is in communication with domain validator 303. It sends the customer identifier determined by the enterprise gateway authentication service and the domain received by interface 308 (or retrieved from ticket database 310) to domain validator 303, which checks customer domain database 306 to determine if it stored domain information corresponding to the received domain. If ticket validator 309 receives positive results from both the ticket database 310 and the domain validator 303, it returns a positive result to interface 308, which passes the result on to the authentication service enterprise gateway. If one or more of the results returned to the ticket validator 309 are negative, it passes on a negative result to the interface 308.

The present system transforms the state of a client from "not authenticated" to "authenticated" in a machine hosting a relying party web application. This occurs as the result of numerous intermediate transformations, including the transformation of a signature-based authenticator to a ticket-based authenticator suitable for use with the Radius protocol.

More generally, various embodiments may include or be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the described subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the described subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the technique in accordance with the described subject matter in hardware and/or firmware. The processor may be coupled to memory, such as RAM, ROM, flash memory, a hard disk or any other device capable of storing electronic information. The memory may store instructions adapted to be executed by the processor to perform the technique in accordance with an embodiment of the described subject matter.

Any of the functionality described herein may be implemented by modules, which can be software, hardware and/or a combination thereof. A module can perform a single function, multiple functions or a function may be partially performed by each of a number of modules. For example, signature and domain validation may be performed by two dedicated modules or by a single module capable of performing both functions. Further, the domain validator and the signature validator module may run on different machines that may be controlled by different parties. Likewise, the system for storing customer domains and generated tickets may be implemented as Software as a Service (SaaS) in the cloud. The data may be stored in a single database, in a single table, in multiple tables, in multiple databases or in one or more distributed databases. The functionality thereof may be implemented using virtualized machines across multiple computers and data centers in multiple locations. The data stores and databases may be monolithic or distributed across numerous machines and locations.

Examples provided herein are merely illustrative and are not meant to be an exhaustive list of all possible embodiments, applications, or modifications of the described subject matter. Thus, various modifications and variations of the described techniques and systems of the described subject matter will be apparent to those skilled in the art without departing from the scope and spirit of the described subject matter.

Although the subject matter herein has been described in connection with specific embodiments, it should be understood that the described subject matter as claimed should not be unduly limited to such specific embodiments. Indeed, various modifications of the described modes for carrying out the described subject matter which are obvious to those skilled in the relevant arts or fields are intended to be within the scope of the appended claims.

What is claimed is:

1. A method comprising:
   receiving a request for a ticket to be sent to a relying party, wherein the request for the ticket comprises data signed with a received signature;
   calculating a local signature based upon a device key and the data signed with the received signature;
   comparing the local signature to the received signature;
   upon determining that the local signature corresponds to the received signature, generating, by a processor, the ticket based upon authentication of the signature;
   causing the ticket to be provided to the relying party;
   receiving a request to validate the ticket from the relying party;
   validating the ticket; and returning the result of the validation of the ticket to the relying party.

2. The method of claim 1, wherein generating the ticket based upon authentication of the signature further comprises generating the ticket based upon validation of a domain of the relying party.

3. The method of claim 1, wherein the relying party has a domain, and wherein receiving the request for the ticket comprises receiving a request to validate a domain of the relying party.

4. The method of claim 1, wherein receiving the request for the ticket comprises receiving a request to authenticate the signature.

5. The method of claim 1, wherein the request for the ticket further comprises a user identifier, and the method further comprising verifying the user identifier.

6. The method of claim 1 wherein receiving the request to validate the ticket from the relying party comprises receiving the request to validate the ticket from the relying party via a gateway.

7. The method of claim 1, wherein returning the result of the validation of the ticket to the relying party comprises returning the result of the validation of the ticket to the relying party via a gateway.

8. The method of claim 1, wherein the ticket is validated at least partly by using the Radius protocol.

9. The method of claim 1, wherein validating the ticket comprises validating a domain bound to the ticket.

10. An apparatus for authentication, comprising:
a plug-in interface that receives data signed with a signature, wherein the data comprises a challenge, an authentication service URL, a site domain, a credential identifier and a user identifier;
a signature validator in communication with the plug-in interface and a key store database that stores device keys, where the signature validator obtains a device key, calculates a local signature based upon the obtained device key and the signed data, compares the local signature to the received signature and sends the result of the comparison to the plug-in interface;
a ticket generator, executable by a processor, that receives a message to generate a ticket from the plug-in interface and in response, generates the ticket, stores a copy of the ticket and an associated device and domain binding in a ticket database and sends the ticket to the plug-in interface;
an authentication service enterprise gateway interface that receives the ticket to be validated; and
a ticket validator in communication with the authentication service enterprise gateway interface, where the ticket validator compares the received ticket to the copy of the ticket in the ticket database and sends the result of the comparison to the authentication service enterprise gateway interface.

11. The authentication apparatus of claim 10, further comprising a domain validator in communication with a customer domain database, where the domain validator compares a domain received from the plug-in interface with a domain stored at the customer domain database and sends the result of the comparison to the plug-in interface.

12. The authentication apparatus of claim 10, further comprising a domain validator in communication with a customer domain database, where the domain validator compares a domain received from the authentication service enterprise gateway interface with a domain stored at the customer domain database and sends the result of the comparison to the authentication service enterprise gateway interface.

13. The authentication apparatus of claim 10, further comprising a device and user identifier binding validator in communication with the ticket database, where the device and user identifier binding validator determines whether that the device associated with the received ticket belongs to the user from whom a request for authentication was received.

14. A non-transitory computer readable medium storing a plurality of instructions that cause a computer to perform a method comprising:
receiving a request for a ticket to be sent to a relying party, wherein the request for the ticket comprises data signed with a received signature;
calculating a local signature based upon a device key and the data signed with the received signature;
comparing the local signature to the received signature;
upon determining that the local signature corresponds to the received signature, generating the ticket based upon the authentication of the signature;
causing the ticket to be provided to the relying party;
receiving a request to validate the ticket from the relying party;
validating the ticket; and
returning the result of the validation of the ticket to the relying party.

15. The non-transitory computer readable medium of claim 14 wherein receiving the request for the ticket comprises receiving a request to validate a domain of the relying party.

16. The non-transitory computer readable medium of claim 14, wherein receiving the request for the ticket comprises receiving a request to authenticate the signature.

17. The non-transitory computer readable medium of claim 14 storing a plurality of instructions that cause a computer to further perform a method comprising validating the ticket at least partly by using the Radius protocol.

18. The non-transitory computer readable medium of claim 14, wherein the request for the ticket further comprises a user identifier, and the method further comprises verifying the user identifier.

19. The non-transitory computer readable medium of claim 14, wherein validating the ticket comprises validating a domain bound to the ticket.

* * * * *